United States Patent
Wang et al.

(10) Patent No.: US 8,244,885 B2
(45) Date of Patent: Aug. 14, 2012

(54) USING DOMAIN NAME SERVICE FOR IDENTIFYING A HOME DOMAIN OF A ROAMING DEVICE

(75) Inventors: Luqing Wang, Keller, TX (US); Syed A. Hussain, Chicago, IL (US); Jheroen P. Dorenbosch, Paradise, TX (US); Marty Ou, Algonquin, IL (US); Niranjan N. Segal, Arlington, TX (US)

(73) Assignee: Motorola Solutions, Inc., Schaumburg, IL (US)

( * ) Notice: Subject to any disclaimer, the term of this patent is extended or adjusted under 35 U.S.C. 154(b) by 685 days.

(21) Appl. No.: 11/964,080

(22) Filed: Dec. 26, 2007

(65) Prior Publication Data

US 2009/0172138 A1 Jul. 2, 2009

(51) Int. Cl.
*G06F 15/173* (2006.01)
*G06F 15/16* (2006.01)
*H04B 7/00* (2006.01)
*H04B 7/216* (2006.01)

(52) U.S. Cl. ........ 709/228; 709/223; 370/310; 370/335; 370/342

(58) Field of Classification Search .................... 709/223
See application file for complete search history.

(56) References Cited

U.S. PATENT DOCUMENTS

| | | | |
|---|---|---|---|
| 5,974,453 A | | 10/1999 | Andersen et al. |
| 6,243,749 B1 | | 6/2001 | Sitaraman et al. |
| 6,469,998 B1 | * | 10/2002 | Burgaleta Salinas et al. 370/338 |
| 6,839,421 B2 | * | 1/2005 | Ferraro Esparza et al. ........................ 379/220.01 |
| 2002/0083198 A1 | | 6/2002 | Kim et al. |
| 2005/0122923 A1 | * | 6/2005 | Jang et al. ...................... 370/310 |
| 2005/0192035 A1 | * | 9/2005 | Jiang ............................. 455/461 |
| 2006/0072517 A1 | * | 4/2006 | Barrow et al. ................. 370/335 |
| 2008/0320015 A1 | * | 12/2008 | Mahdavi ....................... 707/100 |

OTHER PUBLICATIONS

Dommety, Gopal et al.: E.212 number and DNS, draft-dommety-e212-dns-00.txt, expires Jan. 2002, Internet Draft, pp. 1-5.

\* cited by examiner

*Primary Examiner* — Wing Chan
*Assistant Examiner* — David X Yi
(74) *Attorney, Agent, or Firm* — Steven A. May

(57) ABSTRACT

A method, information processing system, and wireless communication network determine a domain name associated with at least one device for providing services to the at least one device in a network. A service request (604) that includes a unique identifier associated with at least one device (102) is received. A query of a remote information processing system (218) is issued for retrieving a plurality of identifier ranges (610). Each of the identifier ranges is associated with one of a plurality of domain names. An identifier range comprising at least the unique identifier associated with the at least one device (102) is identified in the plurality of identifier ranges (614). A domain name associated with the identified identifier range is determined (616). The domain name that has been determined is associated with the at least one device (102).

18 Claims, 7 Drawing Sheets

USING DOMAIN NAME SERVICE FOR IDENTIFYING A HOME DOMAIN OF A ROAMING DEVICE

FIELD OF THE INVENTION

The present invention generally relates to the field of wireless communications devices, and more particularly relates to home domain identification for wireless devices roaming in a network.

BACKGROUND OF THE INVENTION

Current wireless technology allows a new breed of wireless devices referred to as multi-mode wireless devices to communicate over and roam between various wireless networks. For example, multi-mode wireless devices can communicate over multiple separate network technologies using various network services such as Push-To-Talk ("PTT"), Push-To-Talk-Over Cellular ("PoC"), full-duplex voice services, Internet Protocol ("IP") services, and the like.

Problems can arise when a multi-mode wireless devices roams to or from a conventional wireless network such as a circuit services network from or to an IP-based or Session Initiation Protocol ("SIP")-based network. Problems can also arise when a multi-mode wireless devices roams from one IP-based or SIP-based network into another IP-based or SIP-based network. When a conventional wireless device roams from a conventional wireless network to another conventional wireless network, problems can also arise when the conventional network and the other conventional network are coupled via an IP- or SIP-based network.

The above-mentioned networks are often coupled via gateways or proxies. One problem with current roaming procedures for multi-mode devices is that the gateway or proxy for facilitating roaming only receives an International Mobile Subscriber Identity ("IMSI") or a Universal Fleet Member Identifier ("UFMI") to identify the wireless device, while the gateway or proxy also needs a domain name to identify the wireless device with an IP-based or SIP-based network. This problem may manifest itself when the wireless device tries to register. In that case the gateway receives a service request that is a registration request. The service request includes a unique identifier for the device, such as the device's IMSI, but may not include a domain name for the device. A similar problem may occur when the gateway or proxy receives configuration or provisioning requests for the wireless device.

Another problem with current roaming procedures for multi-mode devices is associated with identifier translation during call setup. Identifier translation for calls placed from a conventional wireless network to an IP-based wireless network is usually performed in an information system such as a gateway or proxy between the conventional wireless network and the IP-based wireless network. The gateway typically determines an IP identifier for the caller as well as for the callee. IP-based systems most often use Universal Resource Identifiers ("URIs") for that purpose. Such URIs includes a user part and a host part (userPart@hostPart) where the host part usually comprises a domain name, as is shown by way of example in userPart@specificBox.domainName or userID@domainName.

If all call originators in the conventional wireless network are permanently associated with the same gateway or with the same domain there is a simple solution to determine a host or domain name for the originator. For this simple solution, the gateway is configured with a single host name that is to be used for identification of all call originators or call targets located in the conventional wireless network. Unfortunately, this solution does not work when wireless devices from other domains roam into the conventional system. When a roamed-in device originates a call to or via an IP-based wireless network via the gateway, the gateway would assign the wrong domain name to the originator in this case. The roamed-in device would be identified by the domain name of the gateway of the roamed-to domain, rather than by the domain name of its roamed-from domain, which is also called the device's home domain. This prevents proper identification of the call originator to the call target and may make it impossible to call back from the target in the IP-based wireless network to the originator.

Therefore a need exists to overcome the problems with the prior art as discussed above.

SUMMARY OF THE INVENTION

Briefly, in accordance with the present invention, disclosed are a method, information processing system, and wireless communication network for determining a domain name associated with at least one device for providing services to the at least one device in a network. The method comprises receiving a service request that includes a unique identifier associated with at least one device. A query of a remote information processing system is issued for retrieving a plurality of identifier ranges. Each of the identifier ranges is associated with one of a plurality of domain names. An identifier range comprising at least the unique identifier associated with the at least one device is identified in the plurality of identifier ranges. A domain name associated with the identified identifier range is determined. The domain name that has been determined is associated with the at least one device.

In another embodiment, an information processing system communicatively coupled to a wireless communication network for providing services to at least one device in a network is disclosed. The information processing system comprises a memory and a processor that is communicatively coupled to the memory. The information processing system also comprises a wireless device manager that is communicatively coupled to the memory and the processor.

The wireless device manager is adapted to receive a service request that includes a unique identifier associated with at least one device. A query of a remote information processing system is issued for retrieving a plurality of identifier ranges. Each of the identifier ranges is associated with one of a plurality of domain names. An identifier range comprising at least the unique identifier associated with the at least one device is identified in the plurality of identifier ranges. A domain name associated with the identified identifier range is determined. The domain name that has been determined is associated with the at least one device.

In yet another embodiment, a wireless communication network for providing services to at least one device in a network is disclosed. The wireless communication network includes a plurality of base stations and a plurality of wireless communication devices. The wireless communication devices are communicatively coupled to the plurality of base stations. The wireless communication network also includes at least one information processing system that is communicatively coupled to at least one base station, at least one remote information processing system, and at least one wireless device.

The information processing system comprises a wireless device manager that is adapted to receive a service request that includes a unique identifier associated with at least one device. A query of a remote information processing system is issued for retrieving a plurality of identifier ranges. Each of the identifier ranges is associated with one of a plurality of domain names. An identifier range comprising at least the unique identifier associated with the at least one device is identified in the plurality of identifier ranges. A domain name associated with the identified identifier range is determined. The domain name that has been determined is associated with the at least one device.

An advantage of the foregoing embodiments of the present invention is that it provides an efficient way for managing and facilitating roaming between conventional networks and IP based networks. Rather than retrieving the domain name for each individual device with an individual query, with the present invention a gateway is able to retrieve with a single query multiple identifier ranges from a remote information processing system such as a Domain Name System ("DNS") server or another type of database. The gateway can then use each of those identifier ranges to determine the domain name for a plurality of devices that have an identifier within the identifier range. By using this domain name, the home domain of the at least one wireless device can be determined. A gateway, a proxy, a Dispatch Roaming Registration Entry Point ("DRREP") of a SIP server of the device's home domain can also be determined using, for example, DNS lookup.

Another advantage of the present invention is that a gateway is able to translate a conventional ID used in a conventional system to identify an originating and/or target device into a URI for use in an IP based system. Yet another advantage is that a DNS server can be populated with multiple kinds of identifier ranges, such as IMSI ranges, UFMI ranges, IP address ranges, and the like for managing roamed-in devices and for setting up calls between networks.

BRIEF DESCRIPTION OF THE DRAWINGS

The accompanying figures where like reference numerals refer to identical or functionally similar elements throughout the separate views and which together with the detailed description below are incorporated in and form part of the specification, serve to further illustrate various embodiments and to explain various principles and advantages all in accordance with the present invention.

DETAILED DESCRIPTION

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting; but rather, to provide an understandable description of the invention.

The terms "a" or "an", as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly, and not necessarily mechanically.

The term wireless device is intended to broadly cover many different types of devices that can wirelessly receive signals, and optionally can wirelessly transmit signals, and may also operate in a wireless communication system. For example, and not for any limitation, a wireless device can include any one or a combination of the following: a cellular telephone, a mobile phone, a smartphone, a walky-talky, a dispatch phone, a two-way radio, a two-way pager, a wireless messaging device, a laptop with a wireless connection, and the like. A multi-mode or multi-mode wireless is intended to broadly cover any wireless device that can communicate using more than one wireless service such as UMTS, CDMA, LTE, WiMax, WiFi, Bluetooth, PTT/PoC, cellular, QChat and iDEN.

The term device is intended to broadly cover many different types of devices that include wireless and/or wired devices. Wired devices typically are computers that can be connected to a network via a wire or a cable, such as a PC or a laptop.

Wireless Communication System

Figure 1:
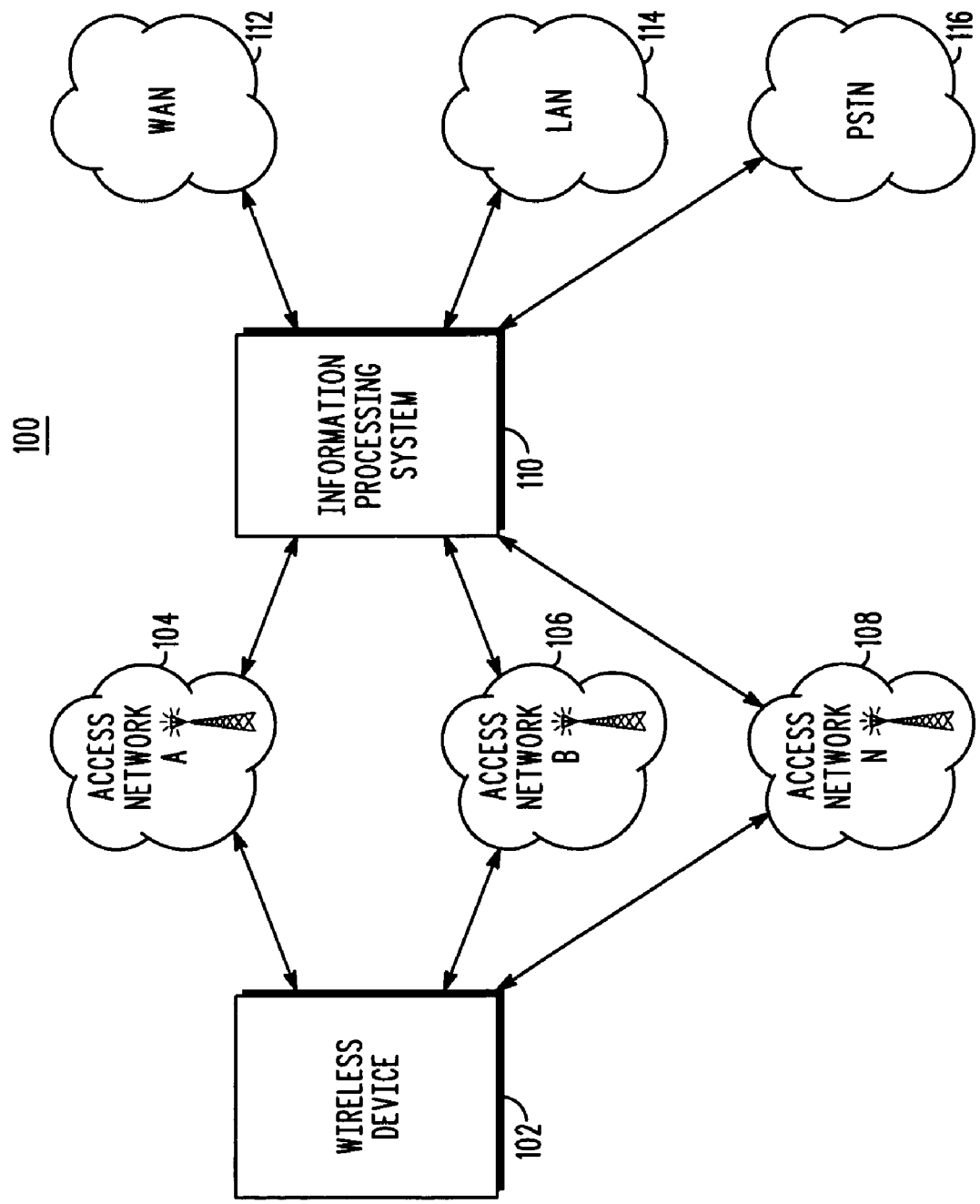
FIG. 1 is a block diagram illustrating a wireless communication system according to an embodiment of the present invention.

According to an embodiment of the present invention, as shown in FIG. 1, an example of a wireless communication system 100 is illustrated. While the present example is discussed in the context of wireless devices, wireless networks, and a wireless communication system, it is understood that this invention should not be limited to only wireless communication systems, and that certain embodiments of the present invention can be implemented in wired networks or in any combination of wired and wireless networks. FIG. 1 shows the wireless communication system 100 comprising one or more wireless devices 102 communicatively coupled to one or more access networks 104, 106, 108. The access networks 104, 106, 108, in one embodiment, can comprise one or more circuit services networks and/or data packet networks. In one embodiment, the packet data network is a network with IP-based or SIP-based connectivity, which provides data connections at much higher transfer rates then a traditional circuit services network. An access network can comprise a CDMA Evolution Data Only ("EV-DO") network, a General Packet Radio Service ("GPRS") network, a Universal Mobile Telecommunications System ("UMTS") network, an 802.11 (WiFi) network, an 802.16 (WiMax) network, Ethernet connectivity, dial-up modem connectivity, an iDEN network, a QChat network or the like. An access network provides, among other things, voice or dispatch services to the wireless device 102. It should be noted that access networks 104, 106, 108 also include additional components (not shown) such as controllers, transport/interconnect gear, network management modules, base stations, and the like that should be known to those of ordinary skill in the art.

The communications standard of the access networks 104, 106, 108 can comprise Code Division Multiple Access (CDMA), Time Division Multiple Access (TDMA), Global System for Mobile Communications (GSM), General Packet Radio Service (GPRS), iDEN, Frequency Division Multiple Access (FDMA), IEEE 802.16 family of standards, Orthogonal Frequency Division Multiplexing (OFDM), Orthogonal Frequency Division Multiple Access (OFDMA), Wireless LAN (WLAN), WiMAX or the like. Other applicable communications standards include those used for Public Safety Communication Networks including TErrestrial TRunked Radio (TETRA). Each access network 102, 104, 106 can be owned and operated by separate wireless service providers. Alternatively, two or more of the access networks 104, 106, 108 can be owned and operated by the same wireless service provider. For example, a single wireless provider can own Access Network A 104, which can be a WiMax system, and can also own Access Network B 106, which can be a cellular system.

The wireless communication system 100 also includes one or more information processing systems 110 that supports, provides access to and controls the access networks 104, 106, 108. Additionally, the information processing system(s) 110 communicatively couples the wireless device 102 via one of the networks 104, 106, 108 to a wide area network 112, a local area network 114, and a public switched telephone network 116 and possibly to the other access networks 104, 106, 108 or to other devices in the other networks 104, 106, 108, 112, 114, 116. The wireless communications system 100 supports any number of wireless devices 102 which can be single mode or multi-mode devices. Multi-mode devices are capable of communicating over multiple access networks with varying technologies. For example, a multi-mode device can communicate over the access networks 104, 106, 108 using various services such as Push-To-Talk ("PTT"), Push-To-Talk Over Cellular ("PoC"), multimedia messaging, web browsing, VoIP, multimedia streaming, iDEN, and the like.

Roaming Management

Figure 2:
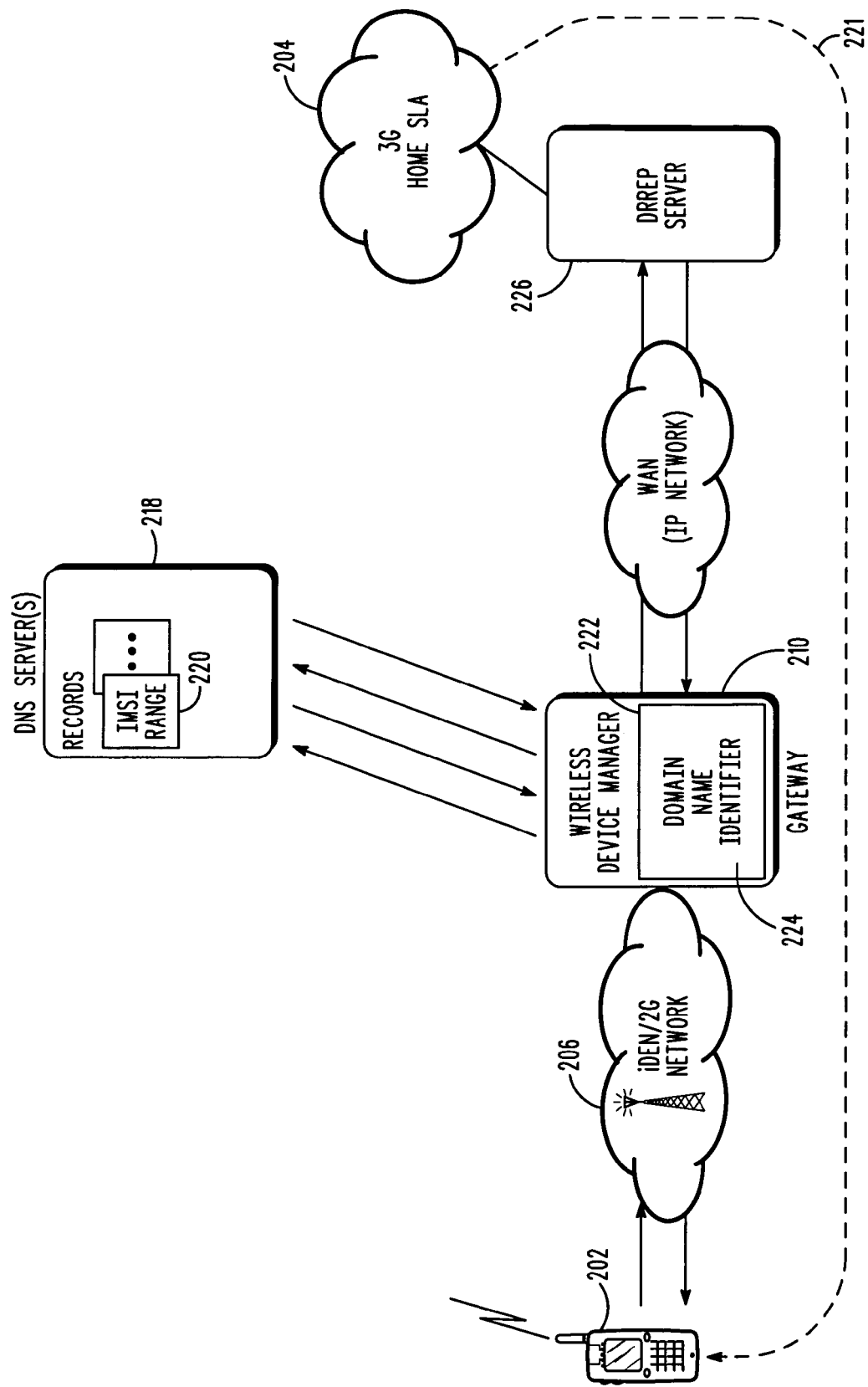
FIG. 2 is a block diagram illustrating an example of a wireless device requesting registration to a roamed into wireless network according to an embodiment of the present invention.

FIG. 2 illustrates a more detailed example of the wireless communication system 100 of FIG. 1. The example of FIG. 2 shows a wireless device 202 having roamed from its home access network 204 to a visited access network 206, where the dashed arrow 221 depicts the roaming. FIG. 2 shows the home network 204 of the wireless device 202 as being a 3G CDMA network and the visited network as being an iDEN/2G network. It should be noted that these are only examples which do not limit the present invention in any way. When the wireless device 202 roams into the iDEN network 206, it requests registration by sending a service request. An information processing system 210 that functions as a gateway is communicatively coupled to the iDEN network 206 and receives the service request.

The information processing system 210 determines that the service request is a registration request. The service request includes an IMSI to provide a unique identifier for the wireless device 202. The IMSI is a globally-unique number associated with a iDEN, GSM or UMTS wireless device. In conventional systems, the information processing system 210 may use the Electronic Numbering protocol ("ENUM") to handle the IMSI. ENUM allows telephone numbers and IMSIs to be resolved to URIs using a Domain Name System ("DNS")-based architecture. ENUM was developed to let network elements find services on the Internet using only a telephone number or an IMSI to identify a wireless device. A problem with ENUM is that separate information must be provisioned for each telephone number and a new ENUM query must be made to handle a new identifier.

However, in one embodiment, a database such as a DNS server 218, which is a remote information processing system, is populated with one or more resource records 220 comprising one or more IMSI ranges for a network operator. In the example of FIG. 2, the DNS 218 includes multiple resource records 220. Each resource record 220, which can be a text record (TXT record), comprises a single IMSI range for a 3G network operator and a domain name for the same operator. The range of IMSIs are mapped to or associated with a domain name. The domain name typically is an IP domain name and typically comprises a single character string or multiple character strings separated by periods. The domain name can be used to determine the home domain or home realm of the registering wireless device 202 and to find a SIP registrar 226 for that domain. The SIP registrar 226 represents an appropriate "entry point" for each network operator. In FIG. 2 the SIP registrar 226 is indicated by the name DRREP, which stands for Dispatch Roaming Registration Entry Point. From hereon in, the SIP registrar 226 is referred to as the DRREP server 226. Examples of TXT resource records comprising a single IMSI range and a domain name are as follows:
imsirange IN TXT "316010000000000 316010999999999 domain-name.com" and
imsirange IN TXT "317770000000000 318889999999999 domain-name.com".

The first IMSI range in this example is defined by the numbers 316010000000000 and 316010999999999. Since IMSIs are integers, the IMSI range is defined as all IMSIs that are greater or equal to 316010000000000 (lower bound) AND less or equal to 316010999999999 (upper bound). The numbers in the TXT record simply define the endpoints of the IMSI integer range. The character string behind the numbers is associated with the range and provides the domain name for all devices with an IMSI in that range. It should be noted that a range is not limited to integers—any combination of numbers, symbols, and the like can be used to define a range. Moreover ranges can also be defined such that values that identify the endpoints of the range are excluded from the range. Each TXT record includes a common text or tag, which is "imsirange" in this example. The use of the common tag makes it possible to retrieve all resource records with IMSI range information in a single query.

In the present invention, the roamed-in wireless device 202 provides its IMSI to the information processing system 210 by including the IMSI in the service request (i.e., the registration request). A wireless device manager 222 residing in the information processing system 210 receives the registration request and the IMSI of the wireless device. The wireless device manager 222 may first perform a check to determine if it has cached IMSI range information from a previous DNS query. If IMSI range information already exists, a domain name identifier 224 of the wireless device manager 222 uses the cached IMSI range information to determine the domain name associated with the device's IMSI. If cached IMSI range information does not exist, the wireless device manager 222 queries the DNS server 218 for IMSI ranges.

In one embodiment, the query is made for all IMSI range information that is available to the DNS. This implies that the query does not need to include the IMSI provided by the device 202 or any part of that IMSI; the query may simply use a generic tag that appears in all IMSI range information records stored in the DNS, such as the tag "imsirange" in the above example. In one embodiment, the query is a text query that queries for TXT records. Also, in many instances only a single query is needed to receive a DNS reply comprising all of the IMSI ranges for all network operators that are stored in the DNS 218.

For reasons of efficiency and speed, the wireless device manager 222 may issue the query for the plurality of identifier ranges by sending a request to the remote information processing system over a User Datagram Protocol ("UDP"). However, with UDP the size of the response is limited and if the information about the plurality of identifier ranges is larger than a predefined length (e.g. 512 bytes), a truncated response is usually received and the request fails. To overcome this problem, in one embodiment of the present invention, the wireless device manager 222 determines whether the request has failed, for example because of a truncated response. If the wireless device manager 222 determines that the request has failed, the wireless device manager 222 performs the query for the plurality of identifier ranges by sending a request using a Transmission Control Protocol ("TCP"). Since TCP allows a response of any length to be received, the result of the query is not truncated when using TCP.

Once the IMSI ranges are received, a domain name identifier 224 residing in the information processing system 210 analyzes the ranges to identify the range comprising the IMSI of the wireless device 202. The domain name identifier 224 can then identify the domain name associated with that range and associates that domain name with the registering wireless device 202. The information processing system 210 then sends an additional query (e.g., a SRV query) to the DNS server 218 to retrieve an identifier for or the address of the DRREP or SIP registrar of the identified domain.

The DNS server 218 responds by returning the Fully Qualified Domain Name ("FQDN") of the DRREP server 226. After the information processing system 210 identifies the DRREP server 226 it forwards the registration request associated with the wireless device 202 to the DRREP server 226. The DRREP server 226 allows the wireless device 202 to become registered in the visited network 206 so that it can use the services in that network. Moreover, a successful registration also registers the current location of the wireless device 202, so that it can be reached, for example, by other wireless devices that call the wireless device 202 from inside the home domain 204.

The use of the invention has several advantages over ENUM. For example, a single IMSI range can be used to associate a domain name with thousands of wireless devices and a single query can retrieve the IMSI ranges for a large number of home domains. This information typically is cached in the information processing system 210 and can be used for later registrations and calls by wireless device 202 and other wireless devices. The invention thus greatly limits the number of DNS queries that is needed, thereby significantly speeding up the call setup time and registrations. Moreover, by the use of TXT records, the provisioning and maintenance of range information in the DNS is greatly simplified.

Also, the representation of the information is very compact: a kilobyte of data may provide a domain name association for millions of wireless devices. Because of the compact representation one can economically store or cache all range information on the gateway. Hence, in a preferred implementation, the gateway queries for all available range information after it is booted up, so that the information is already available when the first service request arrives.

One type of wireless device that uses an IMSI during registration is an iDEN wireless device. During call setup iDEN devices use a UFMI identifier to identify the caller and callee of an iDEN dispatch call. A UFMI comprises three parts, a U or "Urban" part, an F or "Fleet" part, and a MI or "Member ID" part. Each part can be a number and the parts are separated by the "*" character. An example UFMI is 123*456*7890. In this example U=123, F=456, and MI=7890. As discussed above, problems can occur with identifier translation when a wireless device communicates from a network of a first type via or with another network of a second type.

Figure 3:
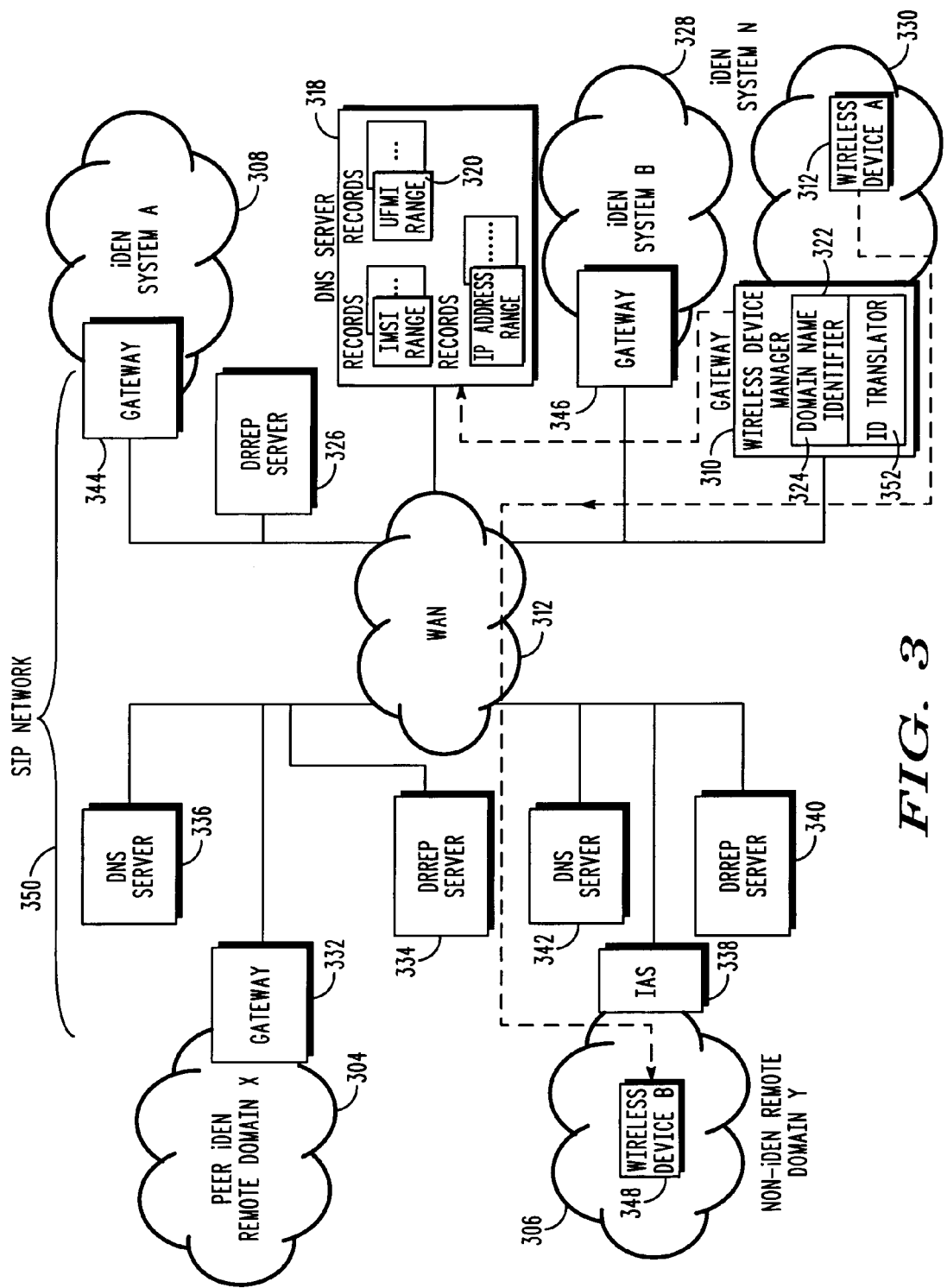
FIG. 3 is a block diagram illustrating an example of a wireless device requesting a call setup in a roamed into wireless network according to an embodiment of the present invention.

For example, problems arise related to the translation of the IDs such as phone numbers and iDEN UFMIs used in conventional networks into the IP equivalents such as Uniform Resource Identifiers ("URIs"). These problems are caused by the lack of domain name information in the IDs used in conventional networks, while a URI requires a domain name. Therefore, another embodiment of the present invention, which is discussed with respect to FIG. 3, provides a method to translate a conventional ID such as those used in dispatch or circuit service networks for identifying an originating and/or a target device into a URI for use in a packet data network. In one embodiment, the resulting URI can be inserted into a SIP "From" and/or "To" header to identify the originating and/or target device in the IP-based system or in the SIP Request URI to affect the further routing of a call setup request. This process is discussed in greater detail below.

FIG. 3 shows another detailed example of the wireless communication network of FIG. 1. FIG. 3 shows a plurality of networks 304, 306, 308, 328, 330 communicatively coupled to each other via a WAN 312. In particular and only for illustration purposes, FIG. 3 shows a peer iDEN network 304, a non-iDEN IP-based network 306, an iDEN network A 308, an iDEN network B 328, and an iDEN network N 330. In one embodiment, the non-iDEN network 306 is an IP-based network. The peer iDEN network 304 is communicatively coupled to a gateway 332, SIP registrar or DRREP server 334, and a DNS server 336. The gateway 332 is an example of an information processing system 110, and the DNS server 336 is an example of a remote information processing system 218. The non-iDEN network 306 is communicatively coupled to another gateway, here referred to as an Integrated Application Server ("IAS"), 338, DRREP server 340, and a DNS sever 342. Each of the iDEN network A 308, iDEN network B 328, and iDEN network N 330 are communicatively coupled to a gateway 344, 346, 310, respectively.

In one embodiment, a single DNS server 318 and a single DRREP server 326 services each of the iDEN network A 308, iDEN network B 328, and iDEN network N 330. The DNS server 318 is another example of a remote information processing system 218. It should be noted that the plurality of networks shown in FIG. 3 can also include additional components (not shown) such as controllers, registers, transport/interconnect gear, network management modules, base stations, and the like that should be known to those of ordinary skill in the art.

In the example of FIG. 3, a wireless device A 302 that has roamed into the conventional iDEN network N 330 wants to communicate with a wireless device B 348 residing in the IP-based network 306. In one embodiment, the conventional iDEN network N 330 and the target IP-based network 306 are connected via a SIP-based system 350. Within the iDEN network N 330, call originators and call targets are identified by UFMIs. By way of example, it is assumed that the wireless device A 302 has a first UFMI of 555*444*333 and originates service request that is a call setup request for a session with the target wireless device B 348 in the IP-based network 306. It is further assumed that wireless device B 348 has a second UFMI of 301*10*2.

To apply the invention to UFMIs, the concept of UFMI ranges is introduced. To define a range for UFMIs, a notation needs to be defined for UFMIs and one needs to define meanings of "equal" and "greater than". A notation can be defined as follows: A UFMI of Ua*Fa*MIa has a U value of Ua, a F value of Fa, and a MI value of MIa. An equality definition can also be defined that states UFMI Ua*Fa*MIa is equal to UFMI Ub*Fb*MIb if and only if (Ua=Ub) AND (Fa=Fb) AND (MIa=MIb). A "greater than" definition can be defined as UFMI Ua*Fa*MIa is greater than UFMI Ub*Fb*MIb if (Ua is greater than Ub) OR ((Ua=Ub) AND (Fa is greater than Fb)) OR ((Ua=Ub) AND (Fa=Fb) AND (MIa is greater than MIb)). In other words, U is the 'most-significant' field and MI is the 'least-significant' field. A UFMI "range" definition can be defined using the definitions above and specifying endpoints Ua*Fa*MIa and Ub*Fb*MIb. A UFMI is in that range if the UFMI is greater or equal to Ua*Fa*Mia AND if Ub*Fb*MIb is greater or equal to the UFMI.

With the above definitions an example DNS TXT record for UFMI ranges may then look like: ufmirange IN TXT "555*444*300-555*444*399 sprint.net" The word "ufmirange" allows a DNS search for UFMI ranges (as opposed to IMSI ranges); IN and TXT are standard tags in DNS records; 555*444*300 and 555*444*399 are the UFMI endpoints for the range; and sprint.net is the domain name to be associated with the devices with UFMIs in the range.

Alternatively, one can also come up with a range of definitions that does not put a constraint on the MI value such as: ufmirange IN TXT "555*400-555*449 verizon.net". One can also provide a range definitions that does not put a constraints on the F and MI value: ufmirange IN TXT "500-541 orange.net". Mixed endpoint notations can also be possible: ufmirange IN TXT "300-333*22*11 cingular.net".

An example of a UFMI range that contains the originator's UFMI can be represented as 555*444*300-555*444*399. Assuming that the originator is homed in the Sprint domain, the DNS record for the range could look like: ufmirange IN TXT "555*444*300-555*444*399 sprint.net". Often all Member IDs in a range of Urban and Fleet values use the same domain name. In this case one can use more efficient range notation, such as ufmirange IN TXT "555*400-555*449 verizon.net". Similarly, when all Member IDs and Fleet values in a range of Urban values have the same domain name one can use an even shorter notation: ufmirange IN TXT "500-541 orange.net". Of course, mixed-mode specifications can be used as well, as in: ufmirange IN TXT "300-333*22*11 cingular.net". It should be clear that the DNS scheme can be extended to cover telephone numbers, IP addresses and the like.

Note that with DNS records of the exemplary format described above all contain a common tag "ufmirange". By using a common tag in all resource records, one can query the DNS for all available UFMI range information using a single TXT query. In this example this is done by using the name or tag "ufmirange" in the query.

In addition to IMSI ranges and UFMI ranges, the present invention can also utilize other types of ranges such as IP address ranges for IPV4 IP addresses. Using similar methods discussed above, IP address ranges for IPV4 IP addresses can be defined. An IP address has four numeric fields separated by period (.) characters (e.g. 10.5.23.156). Equal and greater than relations can again be defined based on the field values. For IP addresses the first field is the most-significant one. An example DNS record for an IP address range is as follows: Ipv4range IN TXT "10.5.0.0 10.6.255.255 orange.net". Ranges for IPV6 addresses can also be defined. An IPV6 address has 8 fields separated by colons (:). The field values are typically encoded as Hexadecimal numbers. An example DNS record for an IPV6 address range can look like: Ipv6range IN TXT "1080:0:0:0:8:800:200C:4000 1080:0:0: 0:8:800:200C:4FFF orange.net".

Integrated Services Digital Network (ISDN) number ranges can also be defined. ISDN numbers are phone numbers and could be represented as integers if properly preceded by country code and area code as in +18172452000. A range of ISDN numbers can then be represented as integer endpoints: isdnrange IN TXT "18172450000 18172459999 motorola.com". Other notation that separate country code and area code may also be supported: isdnrange IN TXT"1-817-2450000 1-817-2459999 mot.com".

Returning to FIG. 3, the DNS server 318 has been configured with TXT resource records 320 as discussed above with respect to FIG. 2. However, in example of FIG. 3 the resource records 320 comprise UFMI ranges, although they can also include IMSI ranges, ISDN number ranges, IP addresses, and the like. For example, an operator can configure the DNS server 318 with the following TXT records: ufmirange IN TXT"555*444*300-555*444*399 sprint.net"; ufmirange IN TXT "555*400-555*449 verizon.net"; ufmirange IN TXT "500-541 orange.net"; and ufmirange IN TXT "300-333*22*11 cingular.net". The wireless device A 302 with a first UFMI of 555*444*333 originates a call setup request for a session with the target wireless device B 348 in the IP-based network 306. Wireless device B 348 has a second UFMI of 301*10*2. The iDEN network N 330 recognizes that the target UFMI is remote to the iDEN network N 330 and uses known routing techniques to route the call to the gateway 310.

Since the gateway 310 connects to a SIP-based system 350, an ID translator 352 within a wireless device manger 322 of the gateway 310 translates the traditional call setup request into a SIP INVITE request. The ID translator 352 translates the originator and target UFMIs specified by the iDEN network N 330 into SIP URIs.

The wireless device manager 322, in one embodiment, queries the DNS server 318 for UFMI range information using a TXT query, preferably requesting all available UFMI range information. This implies that the query does not need to include the UFMI identifier of wireless device A 302 or wireless device B 348 or any part thereof. For the example used above, the wireless device manager 322 can do a TXT query for records with 'ufmirange'. The DNS server 318 returns the records with the UFMI-range—domain name mapping. The gateway 310 matches the UFMI of the wireless device A 302 and the UFMI of the wireless device B 348 to the received ranges. In other words, the gateway 310 identifies the UFMI range that includes the UFMI of wireless device A 302 and the UFMI range that includes the UFMI wireless device B 348. A domain name identifier 324 of the gateway 310 then identifies the domain names associated with the wireless device A 302 and wireless device B 348, respectively. The gateway 310 then constructs a SIP URI corresponding to wireless device A 302 and a SIP URI corresponding to wireless device B 348.

For example, the gateway 310 constructs the SIP URI sip:555*444*333@sprint.net for wireless device A 312 and the SIP URI sip:301*10*2@cingular.net for wireless device B 348. The gateway 310 inserts the SIP URIs for wireless device A 302 and wireless device B 348 in the "From" and "To" header of the SIP INVITE respectively and uses known techniques to route the SIP INVITE to wireless device B 348. It should be noted that the gateway 310 may also query the DNS server 318 prior to receiving a call setup request from the iDEN network N 330. For example, the gateway 310 may query the DNS server 318 for another, earlier call and cache the UFMI ranges. Alternatively, the gateway 310 may query the DNS server 318 when the gateway 310 is started, at the expiration of previously-retrieved DNS records, or the like.

As can be seen, the present invention is advantageous because it provides an efficient way for managing and facilitating roaming and calling between conventional networks and IP base networks. In one embodiment of the present invention a gateway is able to retrieve all IMSI ranges from a DNS server that are required to identify the domain for a plurality of roamed-in devices. In another embodiment, a gateway is able to translate a conventional ID used in a conventional system to identify an originating and/or target device with a URI for use in an IP based system. In particular, the above discussion shows how a gateway is able to obtain the host/domain name corresponding to the conventional ID for insertion into the host part of the URI. The resulting URI can be inserted into a SIP "From" and/or a "To" header for identifying the originating and/or target device in the IP based system. The present invention allows a DNS server to be populated with IMSI ranges, UFMI ranges, IP address ranges, and the like for managing roamed-in devices and for setting up calls within a roamed-in network.

In the examples above, the remote information processing system/DNS 218, 318 queried by the information processing system/gateway 210, 310 includes IMSI range information and UFMI range information for multiple domains or multiple operators. As is known, a remote information processing system like the DNS server 318 may be queried by a plurality of gateways that belong to the same network. This allows for all gateways of the network to obtain consistent information from a common source.

In another embodiment, the plurality of gateways 310, 332, 338, 344, 346 are associated with a plurality of systems or networks 304, 306, 308, 328, 330 and can query the remote information processing system 318 to obtain range information. Consequently, all the gateways in the plurality of networks use consistent information. With this type of collaborative operation, an operator of each of the plurality of networks may enter the IMSI and UFMI range information for its own network into the remote information processing system 218, 318, thereby making it available to all other networks.

As is known, a remote information processing system such as the DNS server 318 may also be implemented as a plurality of connected remote information processing systems 318, 336, 342 in such a way that each remote information processing systems 318, 336, 342 only includes a part of the range information. This way, a distributed system of databases may be created for obtaining the domain names associated with a plurality of identifier ranges. In such an arrangement an operator may have its own DNS Server 218, 318, 336, or 342 and insert its own range information into that DNS Server. The remote information processing systems 318, 336, 342 are connected in such a way that each remote information processing system's range information becomes available to all other the remote information processing systems and thus to all gateways 310, 332, 338, 344, 346 of the plurality of networks 304, 306 308, 328, 330. In an example of such an implementation, the DNS Server 318 may include range information for network A 308, network B 328 and network N 330; the DNS Server 336 may include range information for network X 304; and the DNS Server 342 may include range information for network B 306. The gateways 310, 332, 338, 344, 346 of the plurality of systems 304, 306 308, 328, 330 may then access to all range information by the common consent and agreement as reached by roaming agreements between the operators of networks 304, 306 308, 328, 330.

Advantages of such a distributed DNS Server arrangement are that a network operator maintains and controls its DNS Server within its policies and procedures; and that the local changes and the updates to its DNS Server can be confined without proliferating throughout the other DNS servers. For example, the gateway 310 may query the DNS Server 318 for range information and obtain range information from DNS Server 318 for network A 308, network B 328 and network N 330; from DNS Server 336 for network X 304, and from DNS Server 342 for network Y 306. The range information from DNS Server 336 and from DNS Server 342 may be cached at DNS Server 318 or may be obtained by DNS Server 318 by querying DNS Server 336 and DNS Server 342.

Exemplary Wireless Device

Figure 4:
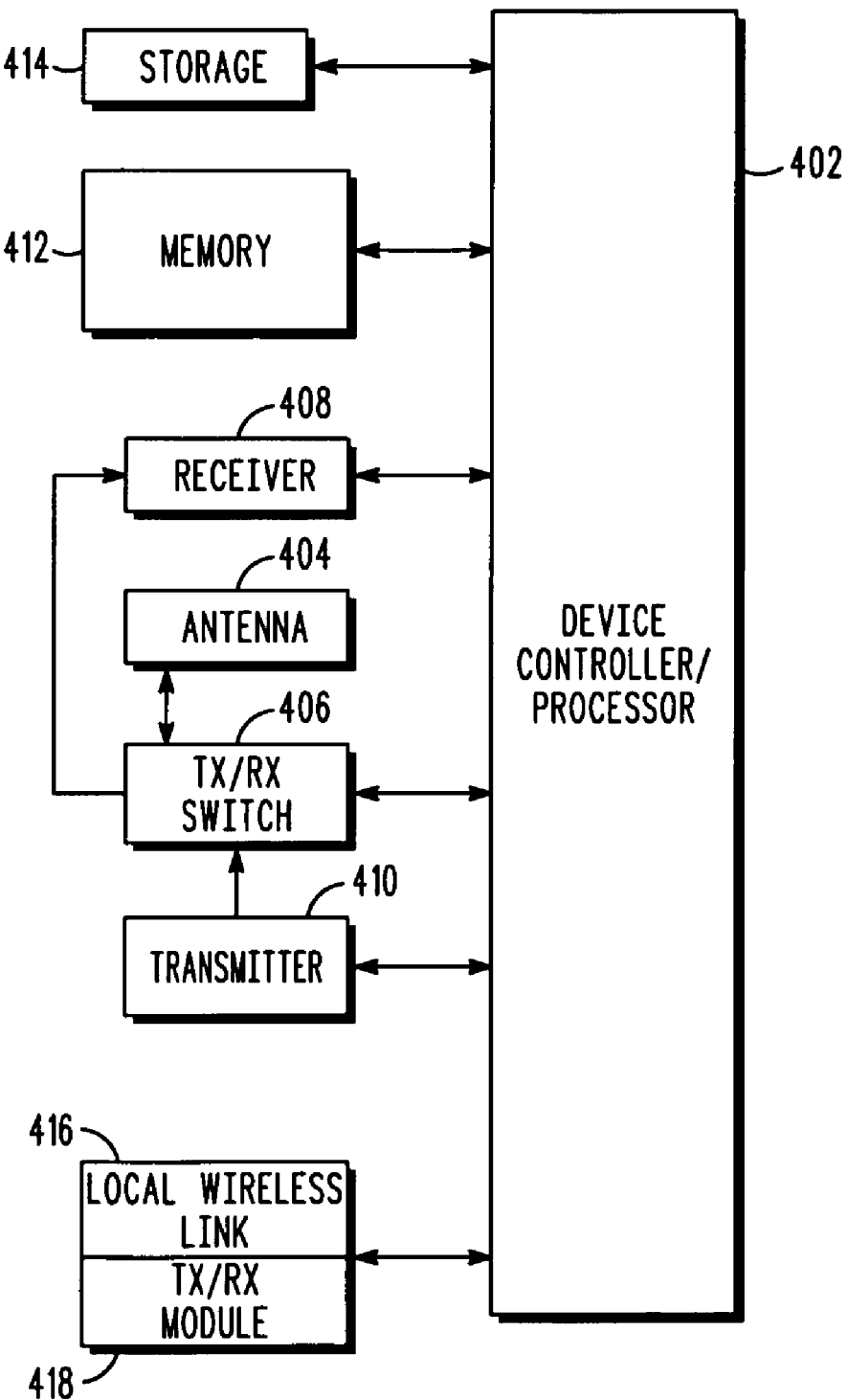
FIG. 4 is a block diagram illustrating a detailed view a wireless device according to an embodiment of the present invention.

FIG. 4 is a block diagram illustrating a detailed view of a wireless device 400, such as wireless devices 102, 202, 312, and 348, according to an embodiment of the present invention. It is assumed that the reader is familiar with wireless communication devices. To simplify the present description, only that portion of a wireless communication device that is relevant to the present invention is discussed. It should be noted that the present invention is not limited to wireless devices. For example, the present invention is also applicable to associating wired devices such as laptop computers (which can roam and initiate/receive calls), desktop computers (can initiate/receive calls), and the like with domain names.

The wireless device 400 operates under the control of a device controller/processor 402, that controls the sending and receiving of wireless communication signals. In receive mode, the device controller 402 electrically couples an antenna 404 through a transmit/receive switch 406 to a receiver 408. The receiver 408 decodes the received signals and provides those decoded signals to the device controller 402. Alternative wireless devices may simultaneously receive and transmit.

In transmit mode, the device controller 402 electrically couples the antenna 404, through the transmit/receive switch 406, to a transmitter 410. It should be noted that in one embodiment, the receiver 408 and the transmitter 410 are a dual mode receiver and a dual mode transmitter for receiving/transmitting over various access networks providing different air interface types. In another embodiment a separate receiver and transmitter is used for each type of air interface (not shown).

The device controller 402 operates the transmitter and receiver according to instructions stored in a memory 412. These instructions include, for example, a neighbor cell measurement-scheduling algorithm. The wireless device 400, also includes non-volatile storage memory 414 for storing, for example, an application waiting to be executed (not shown) on the wireless device or identifiers for the device such as an IMSI or a UFMI. The wireless device 400, in this example, also includes an optional local wireless link 416 that allows the wireless device to directly communicate with another wireless device (not shown) without using a wireless network. The optional local wireless link 416, for example, is provided by Bluetooth, Infrared Data Access (IrDA) technologies, or the like.

The optional local wireless link 416 also includes a local wireless link transmit/receive module 418 that allows the wireless device 400 to directly communicate with another wireless device such as wireless communication devices communicatively coupled to personal computers, workstations, and the like. It should be noted that the optional local wireless link 416 and the local wireless link transmit/receive module 418 can be used to communicate over various access network as discussed above. The wireless device 400 can also comprise hardware/software for connecting to a network via a wired connection.

Exemplary Information Processing System

Figure 5:
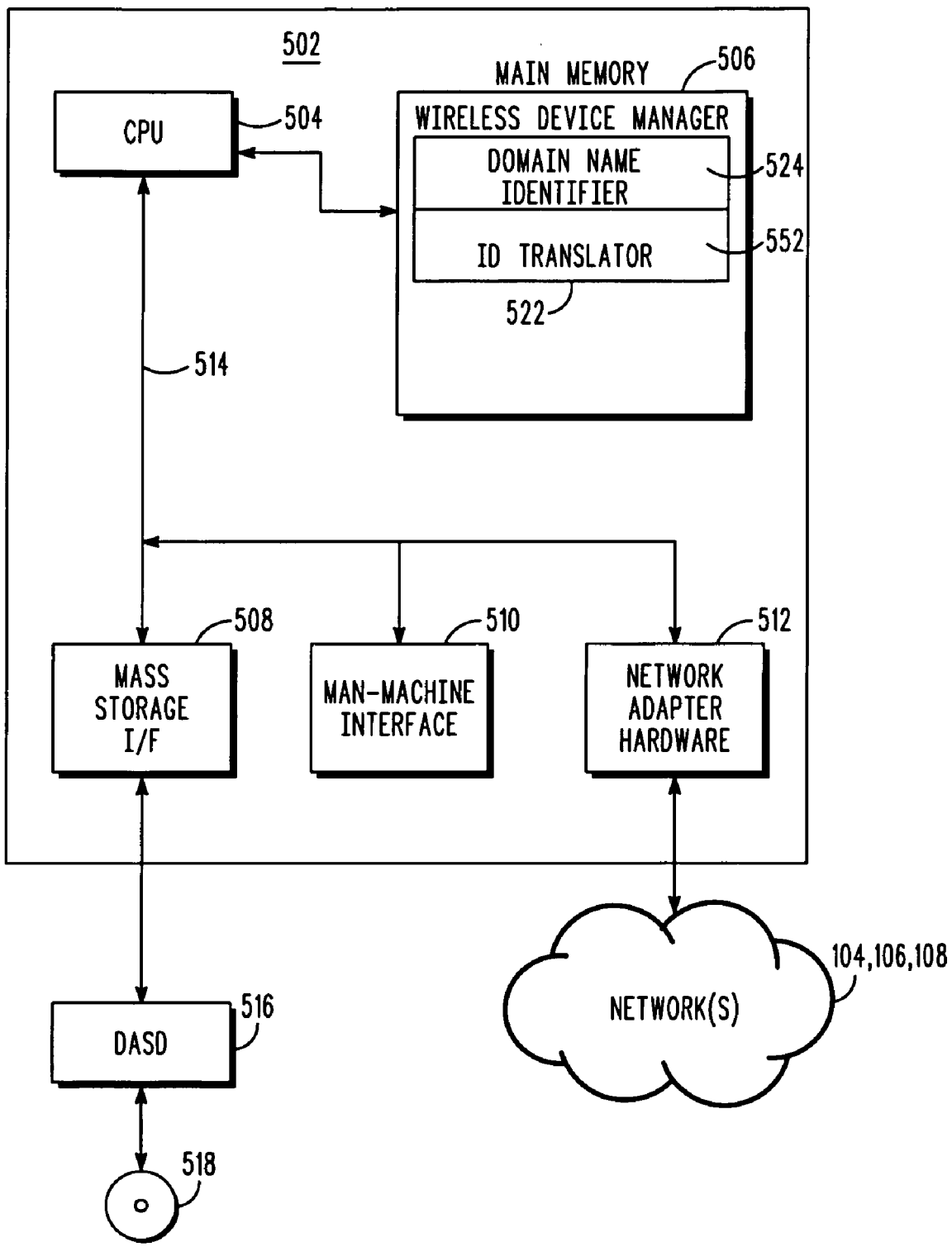
FIG. 5 a block diagram illustrating a general overview an information processing system according to an embodiment of the present invention.

FIG. 5 is a block diagram illustrating a more detailed view of an information processing system 500, such as the information processing system 110 and the gateways 210, 310, according to an embodiment of the present invention. The information processing system 500 is based upon a suitably configured processing system adapted to implement the embodiment of the present invention. For example, a personal computer, workstation, server, or the like, may be used. The information processing system 500 includes a computer 502. The computer 502 has a processor 504 that is connected to a main memory 506, a mass storage interface 508, a man-machine interface 510, and network adapter hardware 512. A system bus 514 interconnects these system components.

The main memory 506 includes a wireless device manager 522, such as wireless device managers 222 and 322, which comprises an ID translator 552, such as ID translator 352, and a domain name identifier 524, such as domain name identifiers 224 and 324. These components have been discussed in greater detail above. Although illustrated as concurrently resident in the main memory 506, it is clear that respective components of the main memory 506 are not required to be completely resident in the main memory 506 at all times or even at the same time. One or more of these components can be implemented as hardware.

A data storage device 516 can store data on a hard-drive or media such as a CD 518. Although only one CPU 504 is illustrated for computer 502, computer systems with multiple CPUs can be used. Embodiments of the present invention further incorporate interfaces that each includes separate, fully programmed microprocessors that are used to off-load processing from the CPU 504. Man-machine interface 520 allows technicians, administrators, and the like, to directly connect to the information processing system 500.

An operating system (not shown) included in the main memory is a suitable multitasking operating system such as Linux, UNIX, Windows XP, and Windows Server 2003. Embodiments of the present invention are able to use any other suitable operating system. Some embodiments of the present invention utilize architectures, such as an object oriented framework mechanism, for executing instructions of the components of operating system (not shown) on any processor located within the information processing system 500.

The network adapter hardware 512 is used to provide an interface to access networks, such as access networks 104, 106, and 108, a public network such as the Internet, a Wide Area Network, such as WAN 312, and the like. Embodiments of the present invention are able to be adapted to work with any data communications connections including present day analog and/or digital techniques or via a future networking mechanism. Although the embodiments of the present invention are described in the context of a fully functional computer system, those of ordinary skill in the art will appreciate that embodiments are capable of being distributed as a program product via floppy disk, e.g., CD/DVD 518, or other form of recordable media, or via any type of electronic transmission mechanism.

Figure 6:
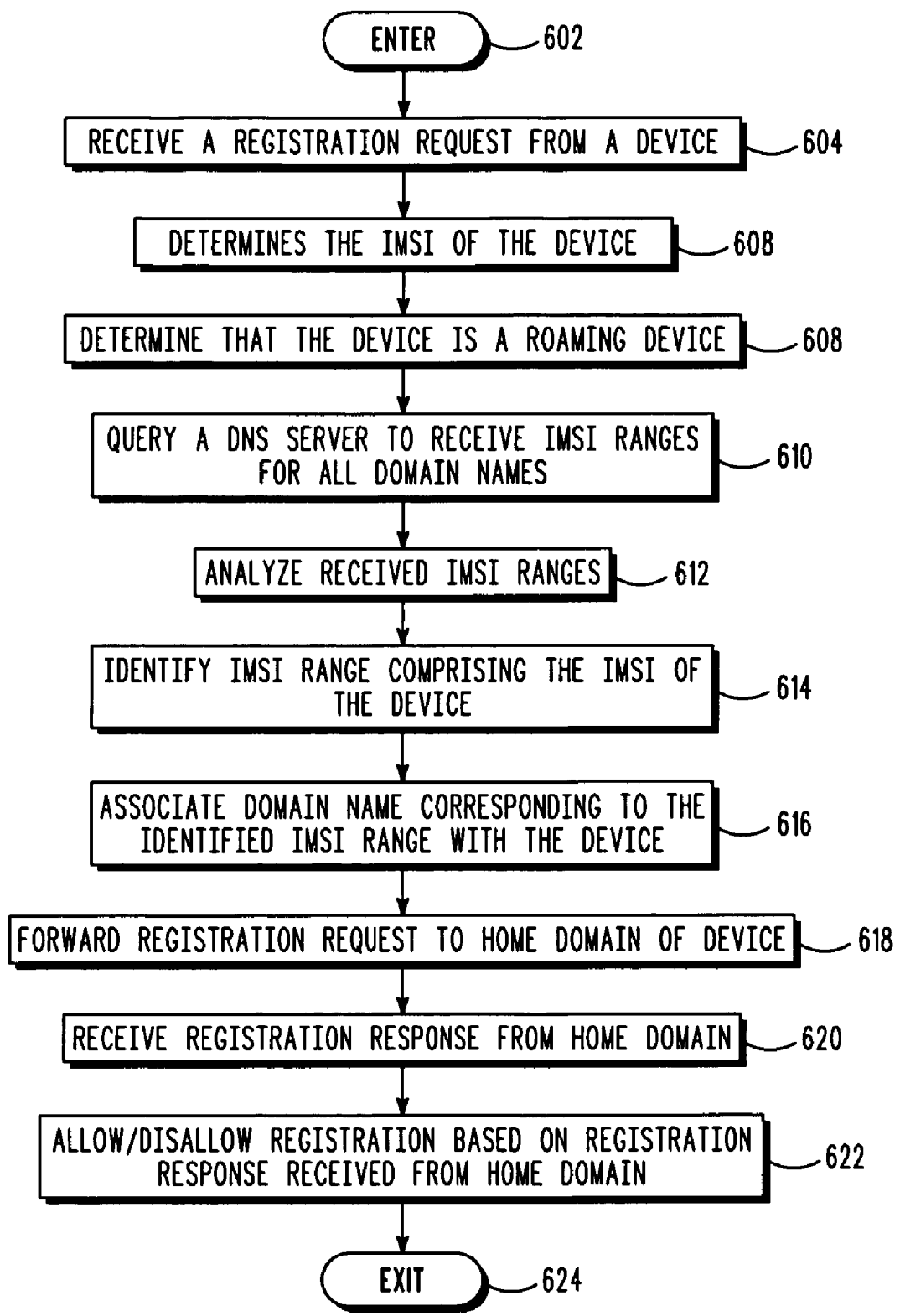
FIG. 6 is an operational flow diagram illustrating a process of determining a home domain for a device requesting registration in a roamed into network according to an embodiment of the present invention.

Process of Determining a Home Domain for a Roaming Device for Device Registration FIG. 6 is an exemplary operational flow diagram illustrating a process of determining a home domain for a roaming wireless, such as wireless device 202. The operational flow diagram of FIG. 6 begins with step 602 and flows directly to step 604. An information processing system, such as information processing system 210, at step 604, receives a transaction request, which is a registration request from the device 202. The transaction request includes an identifier for the device in the form of an IMSI. The information processing system 210, at step 606, determines the IMSI identifier of the device 202. The information processing system 210, at step 608, determines from the IMSI that the device is a roaming device. At step 610, the information processing system 210 sends a query, to a remote information processing system, such as DNS server 218, to retrieve IMSI ranges for one of more service operators. In response to receiving the IMSI ranges, the information processing system 210, at step 612, analyzes the received IMSI ranges.

At step 614, the information processing system 210 identifies the IMSI range comprising the IMSI of the device 202. At step 616, the information processing system 210 associates, with the device 202, the domain name associated with the identified IMSI range. The domain name, in turn, defines the home domain, or home realm of the device 202. Based on the IMSI and the domain name, the information processing system 210 constructs a URI for the device and includes the URI in the registration request. At step 618, the information processing system 210 forwards the registration request to the home domain of the device 202. In response to forwarding the registration request, the information processing system 210, at step 620, receives a registration response from the home domain. The information processing system 210, at step 622, allows or disallows the registration request of the device 202 based on the registration response received from the home domain. The control flow exits at step 624.

Process of Determining a Domain Name for a Device for Call Setup

Figure 7:
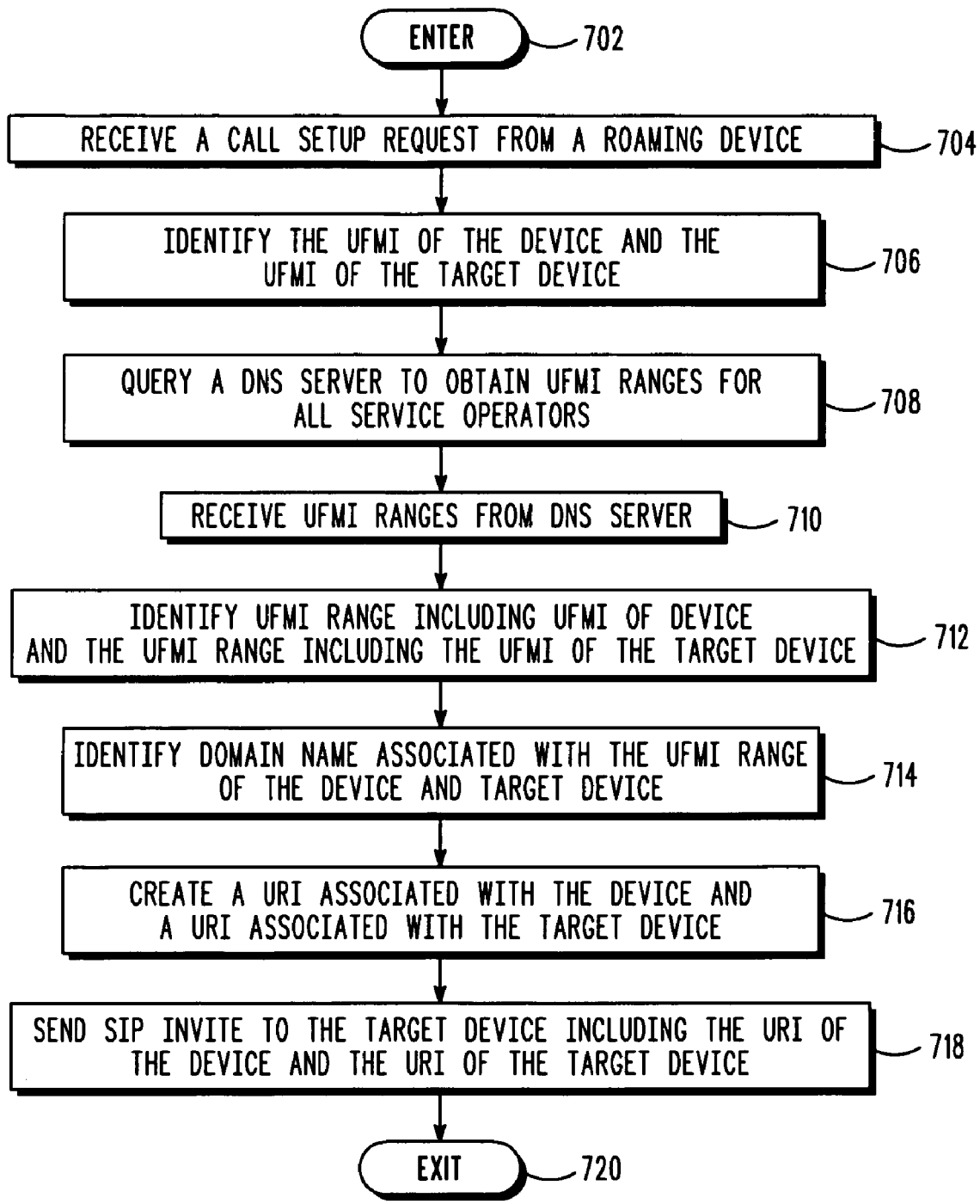
FIG. 7 is an operational flow diagram illustrating a process of determining a home domain name for a device requesting a call setup in a roamed into network according to an embodiment of the present invention.

FIG. 7 is an operational flow diagram illustrating a process of determining a domain name for a wireless device, such as wireless device 302, for call setup. The operational flow diagram of FIG. 7 begins with step 702 and flows directly to step 704. An information processing system, such as information processing system 310, at step 704, receives a transaction request, which is a call setup request, from the device 302. The transaction request includes a UFMI that identifies the calling device 302 and another UFMI that identifies a called target device, such as wireless device 348. The information processing system 310, at step 706, determines the UFMI of the calling device 302 and the UFMI of the target device 348. At step 708, the information processing system 310 sends query to a DNS server, such as DNS server 318, or to another remote information processing system to retrieve UFMI ranges associated with one or more service operators. The UFMI ranges, at step 710, are received by the information processing system 310. The information processing system 310, at step 712, identifies the UFMI range that includes the UFMI of the calling device 302 and the UFMI range that includes the UFMI of the target device 348.

At step 714, the information processing system 310 identifies the domain names associated with the UFMI range corresponding to the calling device 702 and the UFMI range corresponding to the target device 348. The information processing system 310, at step 716, creates a URI associated with the calling device 302 that includes the domain name associated with the UFMI range corresponding to the calling device 702 and a URI associated with the target device 348 that includes the domain name associated with the UFMI range corresponding to the target device 348. At step 718, the information processing system 310 sends a SIP INVITE message to the target device 348 that includes the URI of the calling device 302 in a 'From' header and including the URI of the target device 348 in a 'To' Header. The control flow then exits at step 720.

Non-Limiting Examples

Although specific embodiments of the invention have been disclosed, those having ordinary skill in the art will understand that changes can be made to the specific embodiments without departing from the spirit and scope of the invention. For example, it is anticipated that certain embodiments of the present invention are implemented with many different types of devices with suitable device managers, and information processing systems, communicating in wired networks, in wireless networks, or in any combination of wired and wireless networks.

The scope of the invention is not to be restricted, therefore, to the specific embodiments, and it is intended that the appended claims cover any and all such applications, modifications, and embodiments within the scope of the present invention.

What is claimed is:

1. A method, with an information processing system, for determining a domain name associated with at least one wireless device for providing services to the at least one wireless device in a network, the method comprising:
   receiving a service request that includes a unique identifier associated with the at least one wireless device;
   issuing a query of a remote domain name system (DNS) with the unique identifier for retrieving a plurality of ranges of wireless device identifiers ranges from the DNS, wherein each range of wireless device identifiers of the plurality of ranges of wireless device identifiers comprises a plurality of wireless device identifiers and is associated with a different domain name, of a plurality of domain names, than the other ranges of the plurality of ranges;
   identifying, among the plurality of ranges of wireless device identifiers, a range of wireless device identifiers comprising at least the unique identifier associated with the at least one device;
   determining a domain name associated with the identified range of wireless device identifiers;
   associating the domain name that has been determined with the at least one device;
   wherein the plurality of ranges of wireless device identifiers are maintained as DNS text (TXT) records; and
   wherein each DNS TXT record comprises a range of wireless device identifiers and an associated domain name.

2. The method of claim 1, wherein the service request comprises a registration request.

3. The method of claim 1, further comprising:
   forwarding, in response to determining the domain name, the service request to an information processing system in a realm associated with the domain name;
   receiving a service response from the information processing system in the realm associated with the domain name, wherein the service response indicates that the service request is to be one of granted and denied; and
   notifying, in response to receiving the service response, that the service request is one of granted and denied.

4. The method of claim 1, wherein the service request is a communication setup request and the at least one wireless device comprises one or more of an originator of the communication setup request and a target for the communication setup request.

5. The method of claim 1, further comprising:
   creating, in response to associating the domain name that has been determined associated with the at least one wireless device, a Uniform Resource Identifier ("URI") associated with the at least one wireless device, wherein the URI comprises at least the unique identifier associated with the at least one wireless device and the domain name that has been determined.

6. The method of claim 5, further comprising:
   sending a Session Initiation Protocol request associated with the at least one wireless device, wherein the Session Initiation Protocol request includes the created URI.

7. The method of claim 1, wherein the unique identifier included in the service request comprises one of:
   an International Mobile Subscriber Identity;
   an Urban, Fleet, Member Identification identifier;
   an Internet Protocol address; and
   an ISDN number.

8. An information processing system communicatively coupled to a communication network for providing services to at least one networked device, the information processing system comprising:
   a memory;
   a processor communicatively coupled to the memory; and
   a device manager communicatively coupled to the memory and the processor, wherein the device manager is adapted to:
   receive a service request that includes a unique identifier associated with the at least one networked device;
   issue a query of a remote domain name system (DNS) with the unique identifier for retrieving a plurality of ranges of networked device identifiers from the DNS, wherein each range of networked device identifiers of the plurality of ranges of networked device identifiers comprises a plurality of networked device identifiers and is associated with one a different domain name, of a plurality of domain names, than the other ranges of the plurality of ranges of networked device identifiers;
   identify, among the plurality of ranges of networked device identifiers, a range of networked device identifiers comprising at least the unique identifier associated with the at least one networked device;
   determine a domain name associated with the identified range of networked device identifiers;
   associate the domain name that has been determined with the at least one networked device;
   wherein the plurality of ranges of networked device identifiers comprise one or more DNS text (TXT) records; and
   wherein each DNS TXT record comprises a range of networked device identifiers and an associated domain name.

9. The information processing system of claim 8, wherein the service request comprises a registration request.

10. The information processing system of claim 8, wherein the device manager is further adapted to:
    forward, in response to determining the domain name, the service request to an information processing system in a realm associated with the domain name;
    receive a service response from the information processing system in the realm associated with the domain name, wherein the service response indicates that the service request is to be one of granted and denied; and
    notify, in response to receiving the service response, that the service request is one of granted and denied.

11. The information processing system of claim 8, wherein the service request comprises a communication setup request and the at least one networked device comprises one or more of an originator of the communication setup request and a target for the communication setup request.

12. The information processing system of claim 8, wherein the device manager is further adapted to:
- create, in response to associating the determined domain name with the at least one networked device, a Uniform Resource Identifier ("URI") associated with the at least one networked device, wherein the URI comprises at least the unique identifier associated with the at least one networked device and the determined domain name.

13. The information processing system of claim 8, wherein the device manager is further adapted to:
- send a request to the information processing system for retrieving the plurality of ranges of networked device identifiers over a User Datagram Protocol;
- determine that the request has failed; and
- issue, in response to the request having failed, the query of the information processing system for retrieving the plurality of ranges of networked device identifiers over a Transmission Control Protocol.

14. The information processing system of claim 8, wherein the unique identifier associated with the at least one networked device comprises one of:
- an International Mobile Subscriber Identity;
- an Urban, Fleet, Member Identification identifier;
- an Internet Protocol address; and
- an ISDN number.

15. A wireless communication network for providing services to a plurality of wireless devices, the wireless communication network comprising:
- a plurality of base stations;
- at least one information processing system communicatively coupled to at least one base station of the plurality of base stations, wherein the at least one information processing system comprises a wireless device manager adapted to:
  - receive a service request that includes a unique identifier associated with at least one wireless device of the plurality of wireless devices;
  - issue a query to at least one domain name system (DNS) with the unique identifier for retrieving a plurality of ranges of wireless device identifiers from the DNS, wherein each range of wireless device identifiers of the plurality of ranges of wireless device identifiers comprises a plurality of wireless device identifiers and is associated with a different domain name, of a plurality of domain names, than the other ranges of the plurality of ranges of wireless device identifiers;
  - identify, among the plurality of ranges of wireless device identifiers, a range of wireless device identifiers comprising at least the unique identifier associated with the at least one wireless device;
  - determine a domain name associated with the identified range of wireless device identifiers;
  - associate the domain name that has been determined with the at least one wireless device;
  - wherein the plurality of ranges of wireless device identifiers comprise one or more DNS text (TXT) records; and
  - wherein each DNS TXT record of the one or more DNS TXT records comprises a range of wireless device identifiers and an associated domain name.

16. The wireless communication network of claim 15, wherein the wireless device manager is further adapted to:
- forward, in response to determining the domain name, the service request to an information processing system in a realm associated with the domain name;
- receive a service response from the information processing system in the realm associated with the domain name, wherein the service response indicates that the service request is to be one of granted and denied; and
- notify, in response to receiving the service response, that the service request is one of granted and denied.

17. The wireless communication network of claim 15, wherein the service request comprises a communication setup request and the at least one wireless device is one of a target for the communication setup request and an originator of the communication setup request.

18. The wireless communication network of claim 15,
- wherein the at least one information processing system is connected to at least one other information processing system, and
- wherein the wireless device manager is adapted to retrieve the plurality of ranges of wireless device identifiers by retrieving at least one range of wireless device identifiers from the at least one information processing system and retrieving at least one other range of wireless device identifiers from the at least one other information processing system.

\* \* \* \* \*

UNITED STATES PATENT AND TRADEMARK OFFICE
CERTIFICATE OF CORRECTION

PATENT NO. : 8,244,885 B2  
APPLICATION NO. : 11/964080  
DATED : August 14, 2012  
INVENTOR(S) : Wang et al.

It is certified that error appears in the above-identified patent and that said Letters Patent is hereby corrected as shown below:

In the Drawings:

In Fig. 6, Sheet 6 of 7, delete "[DETERMINES THE IMSI OF THE DEVICE]—608" and insert --[DETERMINES THE IMSI OF THE DEVICE]—606--, therefor.

Signed and Sealed this  
Fourth Day of June, 2013

Teresa Stanek Rea  
*Acting Director of the United States Patent and Trademark Office*